United States Patent

Thor

[11] 4,069,720
[45] Jan. 24, 1978

[54] TWO AXIS SIDE CONTROLLER FOR AIRCRAFT

[76] Inventor: Wayne A. Thor, 6546 Glen Ivy Drive, Dayton, Ohio 45424

[21] Appl. No.: 734,062

[22] Filed: Nov. 5, 1976

[51] Int. Cl.² .............................................. G05G 9/00
[52] U.S. Cl. .................................. 74/471 R; 74/491; 244/83 C
[58] Field of Search ..................... 74/471 R, 469, 491; 244/83 C

[56] References Cited

U.S. PATENT DOCUMENTS

| 2,800,058 | 7/1957 | Henshall et al. | 74/471 R X |
| 3,011,739 | 12/1961 | Boyce et al. | 74/471 R UX |

*Primary Examiner*—Edgar W. Geoghegan
*Attorney, Agent, or Firm*—Joseph E. Rusz; Richard J. Killoren

[57] ABSTRACT

A two axis side controller, for use in manned aircraft, having the roll axis controller adjustably supported on a bracket which is secured to the arm rest. The input axis of the controller is positioned below the front center of the arm rest. A pitch axis controller is secured to the operating arm of the roll axis controller. A hand grip is connected to the control input of the pitch axis controller with an adjustable linkage. Adjustable counterweights are provided on the operating arms of the controllers to adjust the bobweight effect. Springs are provided in the controllers to provide simulated aerodynamic feedback forces to the pilot. Adjustable preloading apparatus is provided for the springs to provide adjustable breakout force. Vibration dampers are also provided in the controllers.

5 Claims, 7 Drawing Figures

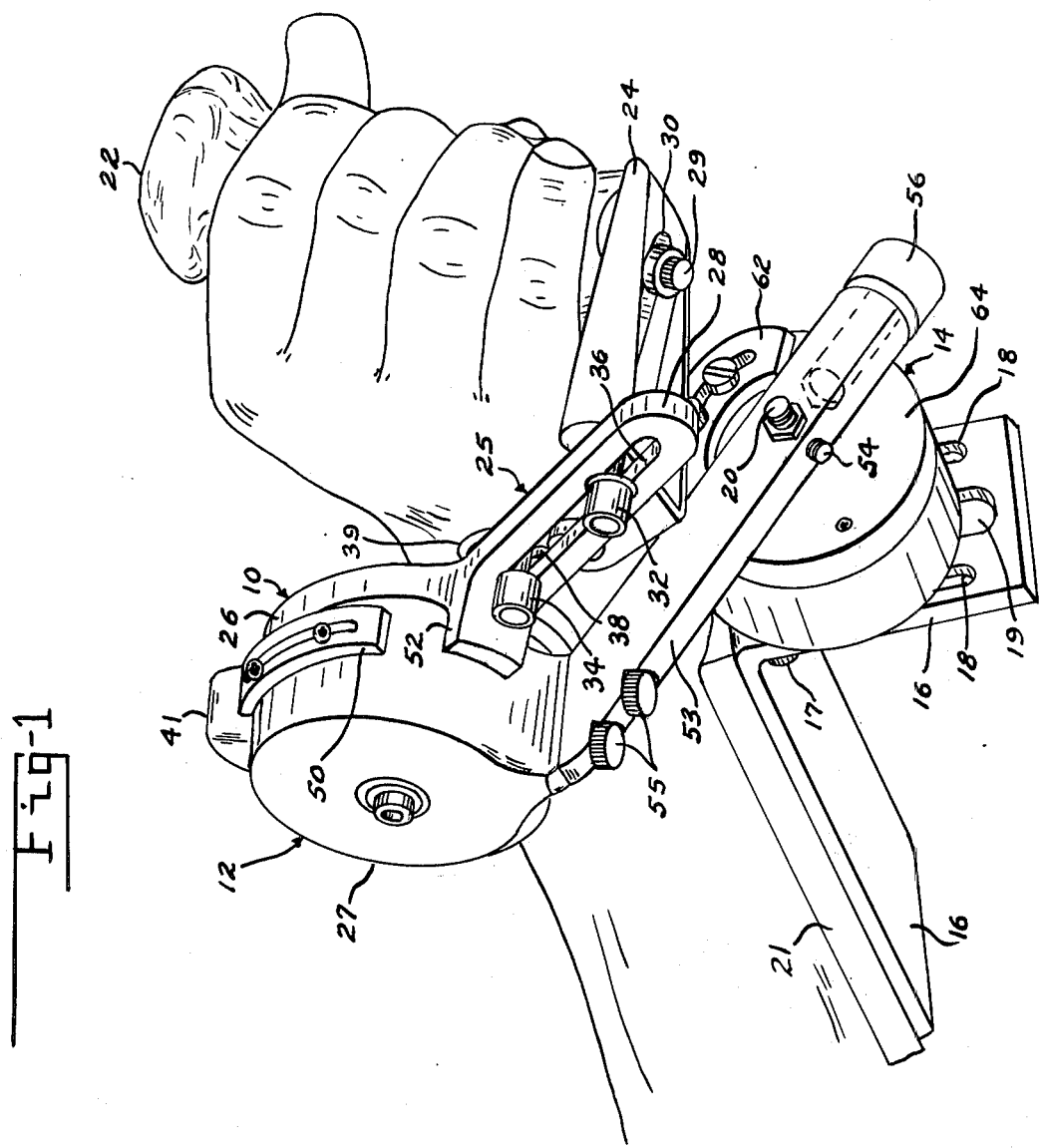

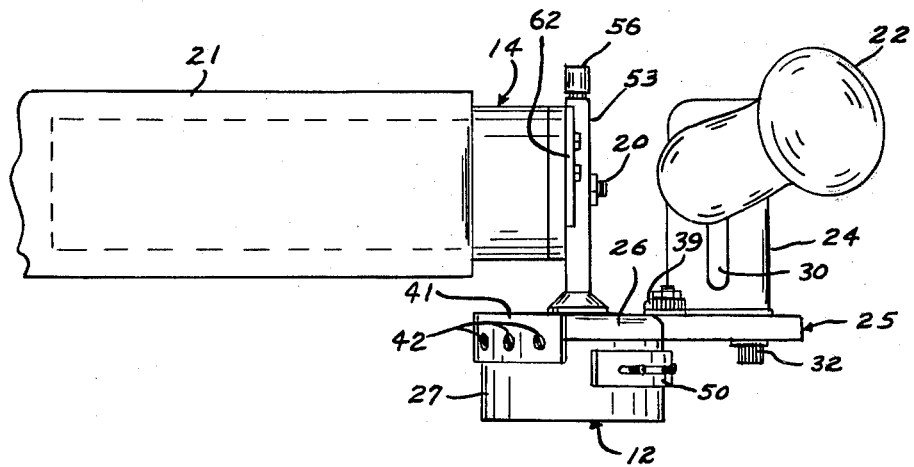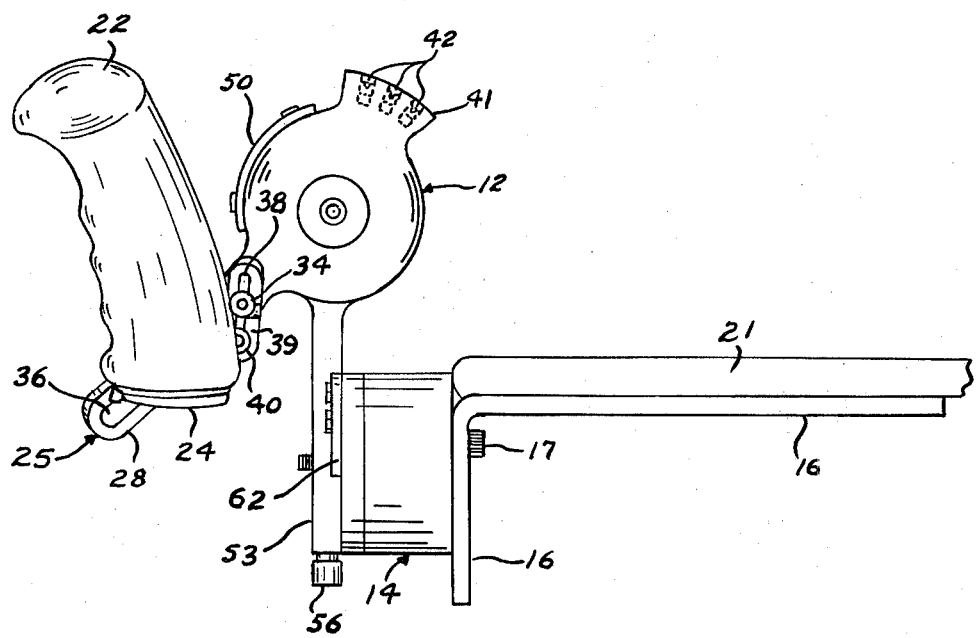

TWO AXIS SIDE CONTROLLER FOR AIRCRAFT

RIGHTS OF THE GOVERNMENT

The invention described herein may be manufactured and used by or for the Government of the United States for all governmental purposes without the payment of any royalty.

BACKGROUND OF THE INVENTION

This invention relates to a two axis side controller for use in manned aircraft and remote pilot control stations.

Various controllers have been used for remote controls, such as for the pitch, yaw and roll control of aircraft. The patents to Aske, U.S. Pat. No. 2,470,968; Osborn, U.S. Pat. No. 2,481,776; Boyce et al, U.S. Pat. No. 3,011,739; Holleman, U.S. Pat. No. 3,028,126 and Buscher et al, U.S. Pat. No. 3,765,263, show some of the systems used for remote control purposes.

One of the important problems with current side controllers is that the pilot must raise his forearm or generally contort his arm to move the stick very far off center. This is difficult under high G-loads and sometimes causes inadvertent inputs into a second axis during attempted one axis inputs. Also, under high load factor conditions, great effort is required by the pilot to raise any part of his arm.

BRIEF SUMMARY OF THE INVENTION

According to this invention, a compact two-axis side controller is provided wherein pitch axis inputs are made by rotating the hand up and down about an axis through the wrist pivot point as in some of the prior art devices described above. Roll axis inputs are made by rolling the hand and wrist on the bottom of the forearm. This allows pitch and roll inputs to the displacement stick which eliminates the necessity of raising or sliding the forearm.

Artificial feel and rate damping are provided in both pitch and roll by means of springs and dampers in the control housing unit.

A bobweight effect is provided by having the mounting plate mass offset from the pitch axis. A variable length linkage is provided between the control stick and the pitch axis control unit to adapt the device for different arm sizes.

IN THE DRAWINGS

FIG. 1 is an isometric view of a two axis side controller according to the invention.

FIG. 2 is a top view of the device of FIG. 1.

FIG. 3 is a left side view of the device of FIG. 1.

DETAILED DESCRIPTION OF THE INVENTION

Figure 4:
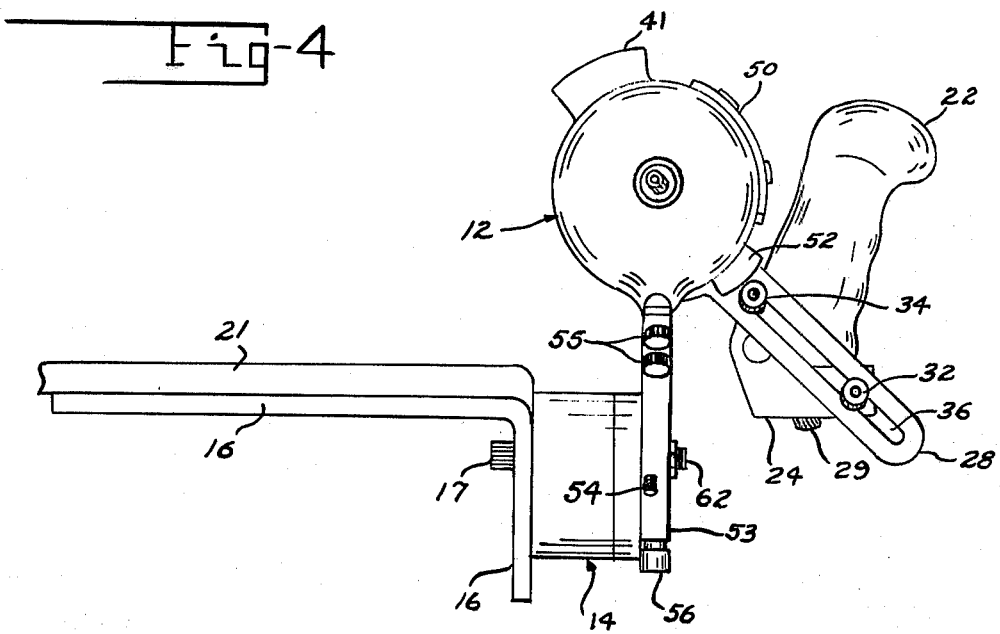
FIG. 4 is a right side view of the device of FIG. 1.

Reference is now made to FIGS. 1-4 of the drawing which shows a two axis controller assembly 10 having a pitch axis controller 12 and a roll axis controller 14. The roll axis controller is secured to a support plate 16 by means of two bolts 17, one of which is shown in FIG. 3. Slots 18 are provided in the support plate to permit vertical adjustment of the controller 14. Slot 19 in support plate 16 receives the end of the shaft connected to input shaft 20 of the roll controller. The axis of the controller input shaft will normally be positioned between 1¼ and 1¾ inches below the top of the arm rest. The support plate is secured to an arm rest 21.

A hand grip 22 is secured to a support plate 24 which is connected by means of an adjustable linkage 25 to the housing member 26 of controller 12. The housing member 26 is moved with respect to housing member 27 by means of linkage 25 and hand grip 22.

The hand grip 22 is made adjustable in support plate 24 by means of a bolt 29 which is movable in a slot 30. The support plate 24 is secured to an arm 28 by means of bolts 32 and 34 which move in slot 36 to permit adjustment of the position of the hand grip 22 with respect to controller 12. The bolt 34 passes through slot 36 and engages a slot 38 in support link 39 which is connected to the support plate 24 by means of bolt 40 as shown more clearly in FIG. 3. This permits rotation of the bolt 32 in slot 36 to permit rotation of the support plate 24.

An adjustable counterweight 41 is provided on housing member 26. The counterweight is made adjustable by means of threaded slugs 42 which are radially adjustable in counterweight 41. Additional weight can be added by means of washers added to bolts which would replace slugs 42. An adjustable stop 50 is secured to the housing member 27 to limit the travel of arm 28. The stop 50 engages counterweight 41 and a shoulder 52 to limit the travel of arm 28.

An arm 53 is secured to shaft 20 of controller 14 and is secured to the housing member 27 by means of bolts 55. A set screw 54 holds arm 53 on shaft 20. An adjustable counterweight 56 is threaded into arm 53 and moves radially to permit adjustment of the counterweight effect. A bobweight effect, which is an increasing force with an increase of incremental G, is provided by the offset of the hand grip 22 from the axis of the controllers. This bobweight effect can be adjusted by adjusting counterweights 40 and 56.

An adjustable stop 62 is secured to the housing 64 of controller 14. Arm 53 engages the stop 62 to limit the travel of arm 53.

Though the controller 12 is operated by moving a portion of the housing and controller 14 is operated by moving a shaft, the internal elements are substantially the same; therefore, only controller 12 will be described.

Figure 5:
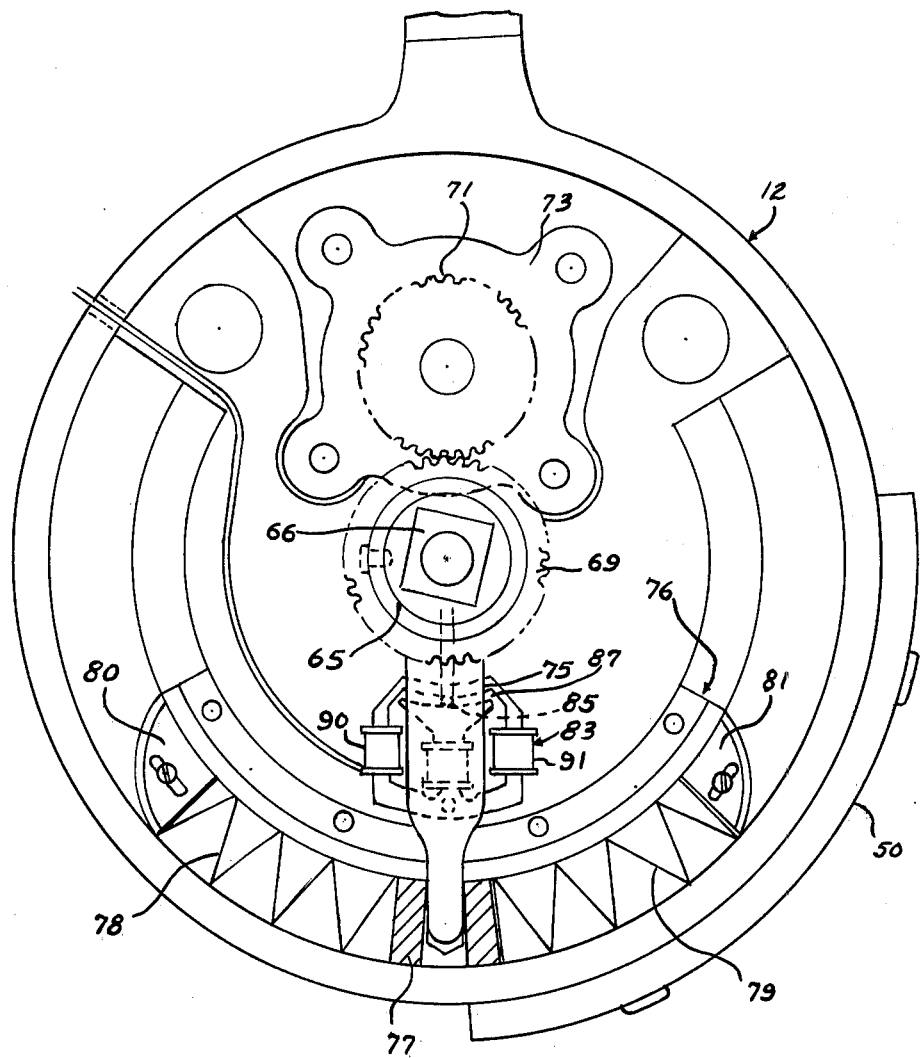
FIG. 5 is a partially schematic view of one of the controllers for the device of FIG. 1 with one side of the housing removed.

As shown in FIG. 5, the controller has a shaft 65 which has a square forward portion 66 which fits into a square hole, not shown, in member 26. In the controller 14, shaft 20 is formed at the end of a shaft 65. The shaft 65 drives a gear 69 which engages a gear 71 on a conventional rotary damper 73. The damper used is an MD-7 miniature dashpot made by the Efdyne Corp. An arm 75 is connected to shaft 65. Arm 75 engages a movable block 77 which engages springs 78 and 79 to provide an artificial feel of aerodynamic feedback forces. Adjustable blocks 80 and 81 provide a preload for spings 78 and 79 to adjust the breakout force for the controllers.

Figure 6:
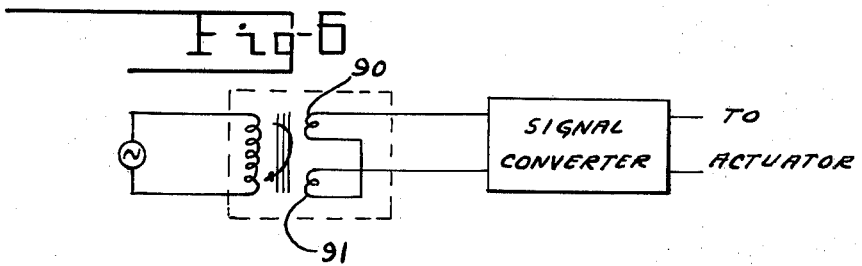
FIG. 6 is a circuit schematic of a control circuit for use with the device of FIG. 1.

The output from the controllers are taken off by means of a conventional adjustable differential transformer 83. The transformer 83 is positioned between the spring assembly 76 and the shaft 65 and below the arm 75. An armature 85 is connected to and rotates with shaft 65. A conventional potentiometer with an appropriate output circuit could replace the circuit shown. Movement of armature 85 in air gap 87 controls the output in the secondary coils 90 and 91 wound in opposition as shown in FIG. 6.

In the operation of the device, the linkage 25 is adjusted to fit the device to the pilot's physiological configuration. The counterweights are then adjusted to provide the desired bobweight effect. Movement of the pilot's hand about an axis through his wrist, which is aligned with the shaft 65 in the pitch controller, provides a corresponding pitch output from the pitch controller 12. The springs 78 and 79 provide a simulated aerodynamic feedback to the pilot. Any pilot or system induced vibrations are damped out by the damper 73.

Figure 7:
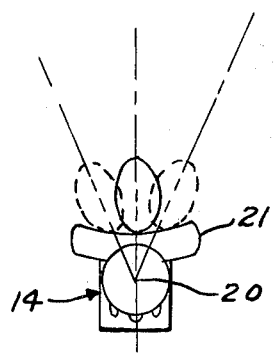
FIG. 7 is a schematic diagram showing the arm movement for roll axis operation for the device of FIG. 1.

Rolling of the pilot's arm on arm rest 21, as shown in FIG. 7, provides a corresponding output from the roll controller 14. Springs similar to springs 78 and 79 and a damper similar to damper 73 provide like effects in the controller 14.

There is thus provided a compact two axis side controller for use under high G loads.

I claim:

1. A two axis side controller for use in a manned aircraft, comprising: an arm rest adapted to support the forearm of the aircraft pilot; a first controller, having an input shaft, adapted to provide a roll control for the aircraft; means for supporting said first controller adjacent the forward end of said arm rest, with the axis of the input shaft of the controller positioned a predetermined distance below the center of the arm rest at the forward end; a second controller, having an input shaft, adapted to provide a pitch control for said aircraft; means for connecting said second controller to the input shaft of said first controller; said means for connecting said second controller to the input shaft of the first controller including means for positioning the axis of the second controller at a position with respect to the arm rest adapted to correspond to the physiological center of rotation of the hand of the pilot about the wrist; a hand grip; means for connecting said hand grip to the input shaft of said second controller.

2. The device as recited in claim 1 including means for adjusting the offset distance between the hand grip from the input shaft of said second controller; means for adjusting the bobweight effect of the hand grip around the input shaft of said second controller.

3. The device as recited in claim 2 wherein said means for adjusting the offset distance between the hand grip and the input shaft of the second controller includes an adjustable linkage; a hand grip support plate means for adjusting the position of the hand grip with respect to said support plate; said adjustable linkage including an arm member connected to the input shaft of said second controller; an elongated slot in said arm member; a first bolt means, passing through said slot for securing said support plate to said arm member; an adjustable link connected to said support plate at a position spaced from said first bolt means; a second bolt means, passing through said elongated slot, for securing said link to said arm member; said arm member having a portion forming a movable portion of a housing for said second controller; said means for adjusting the bobweight effect of the hand grip including an adjustable counterweight connected to said movable portion of said housing; means for limiting the angular motion of said arm member.

4. The device as recited in claim 3 wherein said means for connecting the second controller to the input shaft of the first controller includes a second arm member; a second counterweight; means on said arm member on the side of the input shaft of the first controller, remote from said second controller, for supporting said second counterweight.

5. The device as recited in claim 4 wherein each of said controllers includes means providing simulated aerodynamic feedback forces to said hand grip; a vibration damper in each of said controllers coupled to their input shafts.

* * * * *